United States Patent [19]
Bremer et al.

[11] Patent Number: 5,436,930
[45] Date of Patent: Jul. 25, 1995

[54] SIMULTANEOUS ANALOG AND DIGITAL COMMUNICATIONS WITH A SELECTION OF DIFFERENT SIGNAL POINT CONSTELLATIONS BASED ON SIGNAL ENERGY

[75] Inventors: Gordon Bremer; Kenneth D. Ko, both of Clearwater; Luke J. Smithwick, New Port Richey, all of Fla.

[73] Assignee: AT&T Corp., Murray Hill, N.J.

[21] Appl. No.: 76,516

[22] Filed: Jun. 14, 1993

[51] Int. Cl.$^6$ ............................................. H04L 27/04
[52] U.S. Cl. ................................. 375/295; 370/110.4; 455/93
[58] Field of Search ................... 375/37, 38, 39, 5, 41, 375/42, 52, 59, 67; 455/74, 93, 102; 370/18, 19, 20, 110.1, 110.4

[56] References Cited
U.S. PATENT DOCUMENTS

| | | | |
|---|---|---|---|
| 4,512,013 | 4/1985 | Nash et al. | 370/69.1 |
| 4,546,212 | 10/1985 | Crowder, Sr. | 179/2 C |
| 4,672,602 | 6/1987 | Hargrave et al. | 370/58 |
| 4,757,495 | 7/1988 | Decker et al. | 370/76 |
| 4,891,806 | 1/1990 | Farias et al. | 370/110.1 |
| 4,924,516 | 5/1990 | Bremer et al. | 380/46 |
| 4,937,844 | 6/1990 | Kao | 375/122 |
| 5,022,053 | 6/1991 | Chung et al. | 375/39 |
| 5,081,647 | 1/1992 | Bremer | 375/5 |
| 5,103,227 | 4/1992 | Betts | 341/61 |
| 5,185,763 | 2/1993 | Krishman | 375/39 |
| 5,237,292 | 8/1993 | Chethik | 379/39 |

OTHER PUBLICATIONS

Lim, T. L., et al "Adaptive Equalization and Phase Tracking for Simultaneous Analog/Digital Data Transmission" The Bell System Technical Journal, vol. 60, No. 9, Nov. 1981, pp. 2039-2063.

Fumio Akashi, et al., "High-Speed Digital and Analog parallel Transmission Technique Over Single Telephone Channel", IEEE Transactions on Communications, vol. Com-30, No. 5, May 15, 1982, pp. 1213-1218.

R. Steele, etal., "Simultaneous Transmission of Speech and Data Using Code-Breaking Techniques", The Bell System Technical Journal, vol. 60, No. 9, Nov. 1981, pp. 2081-2105.

B. Widrow, et al., "Adaptive Noise Cancelling: Principles and Applications", Proceedings of the IEEE, vol. 63, No. 12, Dec., 1975.

Stagg, L. J., et al., "An Integrated Digital Subscribers Speech and Data Service", ICC '80 Conf. Rec., vol. 3, Seattle, Wash.; Jun. 8–12, 1980. pp. 39.6.1–39.6.6.

Peled, A., et al "Frequency Domain Data Transmission Using Reduced Computational Complexity Algorithms", ICASSP 80 Proc. Denver, Colo., vol. 1, Apr. 9–11, 1980, pp. 964–967.

Adams P. F., "Speech-band data modems", Electronics & Power, vol. 26, No. 9; Sep. 1980, pp. 733–736.

Bukhviner, V. E., "Speech and Data Transmission in ACS Telephone Channels", Telecomm. & Radio Eng., vol. 30/31; Jul. 1976, pp. 66–70.

Lockhart, G. B., et al., "Method for Superimposing Data on Amplitude-Modulated Signals", Electronics Letters, Apr. 29, 1982, vol. 18, No. 9, pp. 379–381.

Shum, M. N. Y., et al., "A New Generation of Speech Plus Data Multiplexer", Conf. on Communications and Equipment and Systems, Birmingham, England, Apr. 4–7, 1978, pp. 111–113.

Primary Examiner—Stephen Chin
Assistant Examiner—Hai H. Phan
Attorney, Agent, or Firm—Christopher N. Malvone

[57] ABSTRACT

An analog signal is added to a data signal that specifies a symbol in a symbol constellation to produce a combined signal that is transmitted to a receiver. The symbol constellation is picked from a plurality of symbol constellations having differing symbol densities based on the amplitude of the analog signal.

22 Claims, 9 Drawing Sheets

SIMULTANEOUS ANALOG AND DIGITAL COMMUNICATIONS WITH A SELECTION OF DIFFERENT SIGNAL POINT CONSTELLATIONS BASED ON SIGNAL ENERGY

CROSS-REFERENCE TO RELATED APPLICATION

Related subject matter is disclosed in the application filed concurrently herewith and assigned to the same assignee hereof entitled "Simultaneous Analog and Digital Communication", inventors Gordon Bremer and Kenneth D. Ko.

FIELD OF THE INVENTION

This invention relates to simultaneous transmission of analog and digital signals and, more particularly, to simultaneous transmission of analog signals and digital signals in a non-multiplexed manner and in a co-extensive frequency band.

DESCRIPTION OF THE PRIOR ART

In the prior art, when voice and data is transmitted simultaneously over a channel, it is typically transmitted either via frequency-division multiplexing or time-division multiplexing. In frequency-division multiplexing, the data channel and the voice channel are allocated different sub-bands of the channel's bandwidth. Examples of that are U.S. Pat. No. 4,757,495, U.S. Pat. No. 4,672,602, and U.S. Pat. No. 4,546,212. In time-division multiplexing arrangements, voice signals are sampled, digitized and interleaved with digital data to form a single information stream which is communicated over the available channel. Practically every digital carrier system (e.g. the T1 carrier system) is an example of that.

U.S. Pat. No. 4,512,013, issued Apr. 16, 1985, presents an interesting approach that is close to a frequency division multiplexing arrangement for simultaneous voice and data. The arrangement filters the speech signal and adds thereto a modulated narrowband signal to form the transmitted signal. The narrowband modulated signal derives from a narrowband digital input signal that is modulated with a carrier, thereby shifting the narrow-band up in frequency to a position in the spectrum where there is little speech energy. At the receiver, in reliance of the fact that the speech power is low in the narrowband occupied by the modulated digital signal, the digital signal is recovered through appropriate demodulation. Thereafter, the recovered digital signal is remodulated to replicate the transmitter's operation, adaptively filtered to account for channel characteristics, and subtracted from the received signal. The result is the received speech. As indicated above, one salient characteristic of that arrangement, as stated in col. 2, lines 13–18, is that ". . . an entire analog speech signal and a modulated data signal are capable of being transmitted over a normal analog channel by the multiplexing of the data signal within the portion of the normal analog speech signal frequency band where the speech signal is present and the power density characteristic thereof is low". As an aside, the 4,512,013 arrangement is half duplex.

In the modem art, digital information is communicated over a channel by converting the digital information to analog form. In the most basic form, a modem filters the digital signal (i.e., shifts it in frequency) to form a band-limited signal and modulates that signal to reside within the passband of the communication channel. In telephony, for example, that passband may be between 300 Hz and 3500 Hz. To increase the information-carrying capacity of the modulated signal, more sophisticated modems employ quadrature modulation. Quadrature modulation is often depicted as a two-dimensional signal space. Use of the signal space to send voice information is disclosed in U.S. Pat. No. 5,081,647 issued Jan. 14, 1992.

Use of the signal space to send data and voice in described is "High Speed Digital and Analog Parallel Transmission Technique Over Single Telephone Channel", Ajashi et al, IEEE Transactions on Communications, Vol. 30, No. 5, May, 1982, pp. 1213–1218. Unlike prior techniques, where analog and data were segregated into different time slots (TDM) or different frequency bands (FDM), they describe separating analog and data signals into the two different channels of the QAM system. That is, Ajashi et al suggest modulating the in-phase channel with the analog signal, and modulating the quadrature channel with the data signal. Building on that description and concerning themselves with channel equalization, Lim et al analyze equalizer performance in "Adaptive Equalization and Phase Tracking For Simultaneous Analog/Digital Data Transmission", BSTJ, Vol. 60 No. 9, November 1981, pp. 2039–2063. (The 1981 BSTJ article cites the information of 1982 IEEE article as "unpublished work").

No one has achieved the ability to simultaneously sent both data and voice through both channels of a QAM system, and no one has achieved the ability to communicate both by data and analog, simultaneously, and in full-duplex, over a single bidirectional bandlimited communications channel.

SUMMARY OF THE INVENTION

In a communication system that simultaneously transmits analog signals and data signals, it is desirable to identify periods of near silence so that the data rate can be increased to take advantage of the near silence period.

The present invention varies the density of a symbol or signal point constellation used to send data based on the energy of an analog signal that is added to the data signal. When the amplitude of analog signal falls below a threshold, the density of the symbol constellation is increased to take advantage of a lower amplitude analog signal that is added to the data signal.

DETAILED DESCRIPTION

Figure 1:
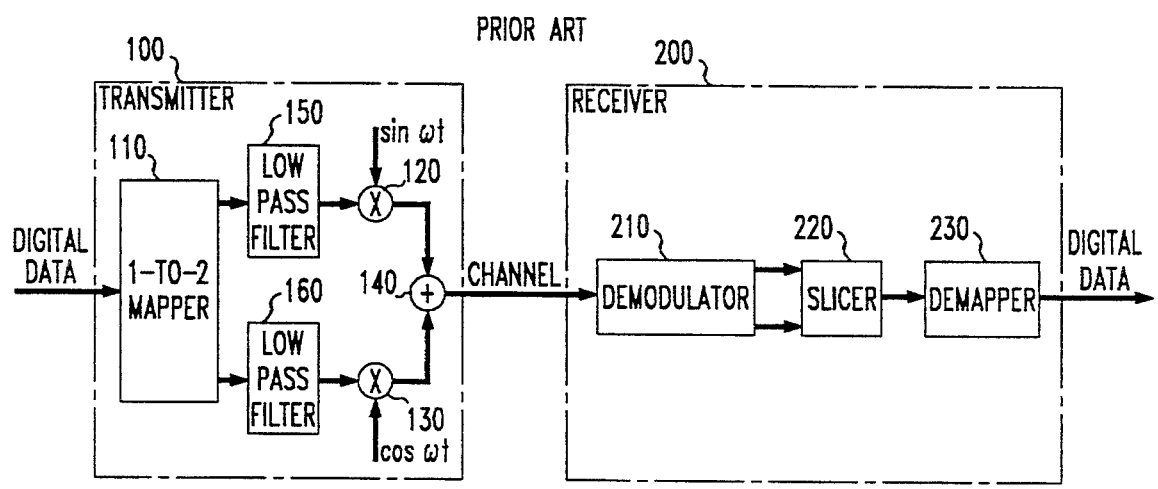
FIG. 1 presents the basic structure of a prior art modem.

To place this invention in context, FIG. 1 presents a very basic block diagram of a modem that communicates digital data via quadrature modulation techniques. Section 100 is the modem's transmitter section and section 200 is the modem's receiver section. Specifically, in the transmitter section digital data is applied in FIG. 1 to a 1-to-2 mapper 110, and mapper 110 develops two outputs which typically are referred to as the in-phase and quadrature samples. The in-phase samples are applied via low pass filter 150 to modulator 120, which multiplies the applied signal by a carder—i.e, $\sin\omega t$ in FIG. 1. The quadrature samples are applied via low pass filter 160 to modulator 130, which multiplies the applied signal by a second carder. The second carrier is orthogonal to the first carrier; namely, $\cos\omega t$. Filters 150 and 160 must be bandlimited to no more than $\omega$, in order to avoid aliasing and to at least half the inverse of the output sample rate of mapper 110. The output signals of modulators 120 and 130 are added in element 140 to develop the analog signal of the modem's transmitter section.

In operation, the digital data applied to the FIG. 1 apparatus is a stream of bits. Element 110 views the incoming signal as a stream of symbols that each comprises a preselected number of consecutive bits, and maps each symbol into an in-phase analog sample and a quadrature analog sample.

Figure 2:
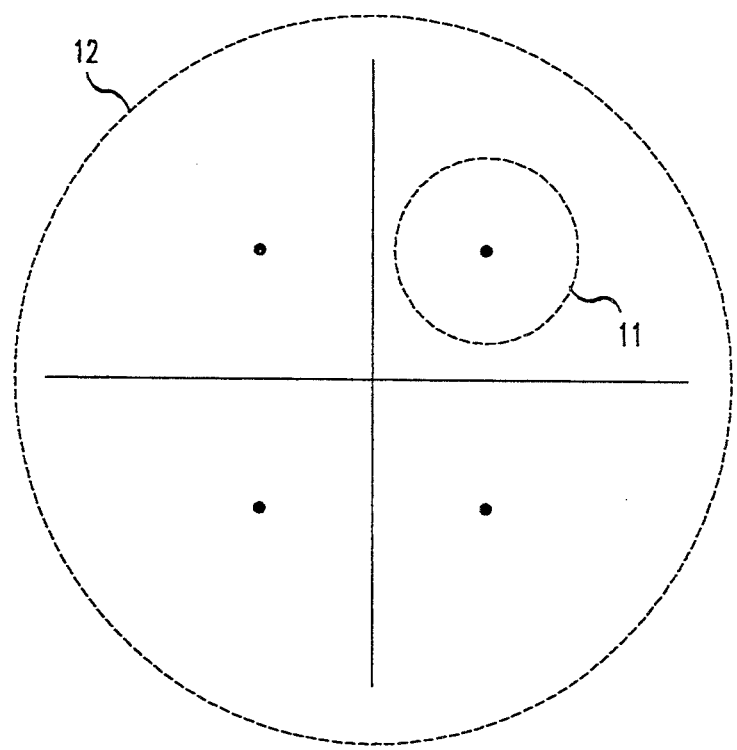
FIG. 2 shows the signal space and an illustrative signal constellation for the FIG. 1 system.

Practitioners in the art often describe the operations performed in the FIG. 1 apparatus by means of a signal space diagram, such as shown in FIG. 2. The x axis corresponds to one of the carrier signals (e.g., $\cos\omega t$) and the y axis corresponds to the other carder signal ($\sin\omega t$). The in-phase and quadrature samples delivered by element 110, in effect, specify a location in the signal space of FIG. 2. Accordingly, the set of possible samples that element 110 can produce corresponds to a set of sample points (i.e., a constellation of points) in the signal space depiction of FIG. 2. A 4-point signal constellation is shown, by way of illustration, in FIG. 2. It is well known, however, that one can create signal point constellations with a larger number of signal points.

To receive signals that were modulated by the FIG. 1 apparatus in accordance with the specific constellation depicted in FIG. 2, one must only identify whether the received signal is in the first, second, third or fourth quadrant of the signal space. That means that there exists great latitude in the signals that are received, and any received signal that is still in the correct quadrant is mapped to the correct constellation signal point in that quadrant. Extended to other (and perhaps larger) constellations, the signal space can be divided into regions and the receiver's decision is made with respect to the region in which the received signal is located. We call these regions "neighborhood" regions.

Returning to FIG. 1 and addressing the modem's receiver section, the modulated signal is applied to demodulator 210. Demodulator 210 recovers the in-phase and quadrature components and applies them to slicer 220. Slicer 220 converts the in-phase and quadrature components into symbols and applies the symbols to de-mapper 230. De-mapper 230 maps the symbols into bit streams to form the recovered digital data stream.

Absent any signal degradation (such as due to noise added in the channel) the signal received by demodulator 210 would be precisely the same as the signal sent by adder 140, and a determination of neighborhood regions in which the signal is found (by slicer 220) would be relatively simple and error-free. However, noise that is added to the transmitted signal shifts the received signal in the signal space and modifies the input to slicer 220. Stated in other words, a noise signal that adds to the signal flowing through the communication channel corresponds to a vector signal in the signal space of FIG. 2 that is added to a transmitted sample point. That added vector is of unknown magnitude and unknown phase. Consequently, added noise converts a transmitted signal that corresponds to a point in the signal space into a region in the signal space. This phenomenon is depicted in FIG. 2 by circle 11. Some refer to this circle as a signal space "noise cloud" surrounding the transmitted signal.

From the above it is clear that in order to detect the transmitted signals without errors, the neighborhood regions must be large enough to encompass the noise cloud. Since the average power of the sent signal is typically limited by other considerations, the extent to which the signal constellation covers the infinite space represented by the x and y axes is also limited. This is represented in FIG. 2 by circle 12. The restriction imposed by circle 12, coupled with the restriction on the size of the neighborhood regions that is imposed by noise considerations limits the number of transmitted signal points in the constellation.

Figure 3:
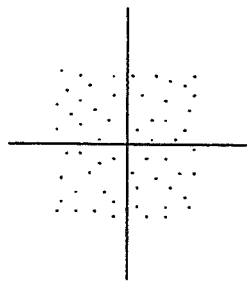
FIG. 3 shows the signal space of a QAM analog system.

As indicated above, it has been observed that in typical modem designs the allowable signal power and the expected fidelity of the channel combine to control the constellation size. Less noisy channels allow for larger constellations, and larger constellations permit higher digital data throughputs. This leads to a totally revolutionary idea of utilizing all, or essentially all, of the available signal space for the transmission of information. A transmitter signal space in accordance with this revolutionary approach is depicted in FIG. 3 where a plurality of signal points are depicted randomly within the signal space. These points are illustrative of the various vectors that the transmitter is allowed to send out. There are no more "constellations of points", where a decision must be made between constellation points; there is only the entirety of the signal space. In other words, rather than having digital signals that are mapped onto a fixed constellation within a signal space, FIG. 3 depicts analog signals that are mapped onto a signal space. When the analog signals that form the in-phase component are independent of the analog signals that form the quadrature component, the viable signal space of FIG. 3 may be rectangular.

Having recognized the advantages of sending analog signals in accordance with the signal space of FIG. 3, the next innovation is to alternate between the signal spaces of FIG. 2 and FIG. 3. That is, the innovation is to send customer analog signals or customer digital signals as the need arises. This is depicted in FIG. 4.

Figure 4:
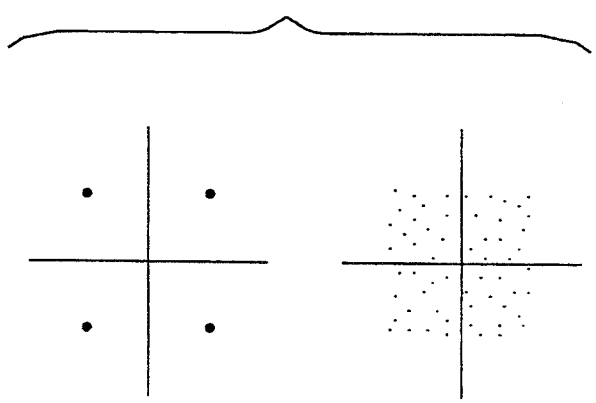
FIG. 4 shows the signal space of an alternating digital and analog system.

Further, having recognized the advantages of sending either analog or digital signals in accordance with the signal spaces of FIG. 4, it was discovered that a totally different communication approach can be taken, that communicating both analog and digital signals, can be expressed concurrently, in a combined signal space. This is illustrated in FIG. 5, where four neighborhoods are identified for illustrative purposes, with demarcation borders identified by dashed lines 21 and 22.

Figure 5:
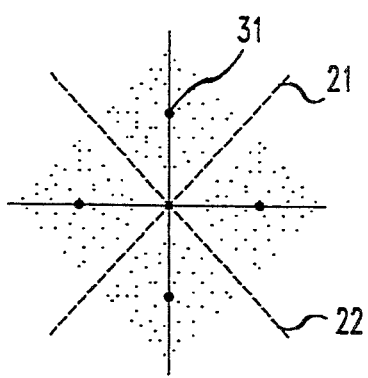
FIG. 5 shows the signal space of a combined digital and analog system.

It may be noted that, for purposes of this disclosure, according to the FIG. 5 depiction, the analog signals that form "signal clouds" around each digital constellation point (e.g., point 31) should be restricted in their dynamic range to be totally contained within the neighborhood regions. Hence, here too there is a wade-off between constellation size (which directly affects digital through-put) and dynamic range of the transmitted analog signal (which in some situations translates to "resolution").

Figure 6:
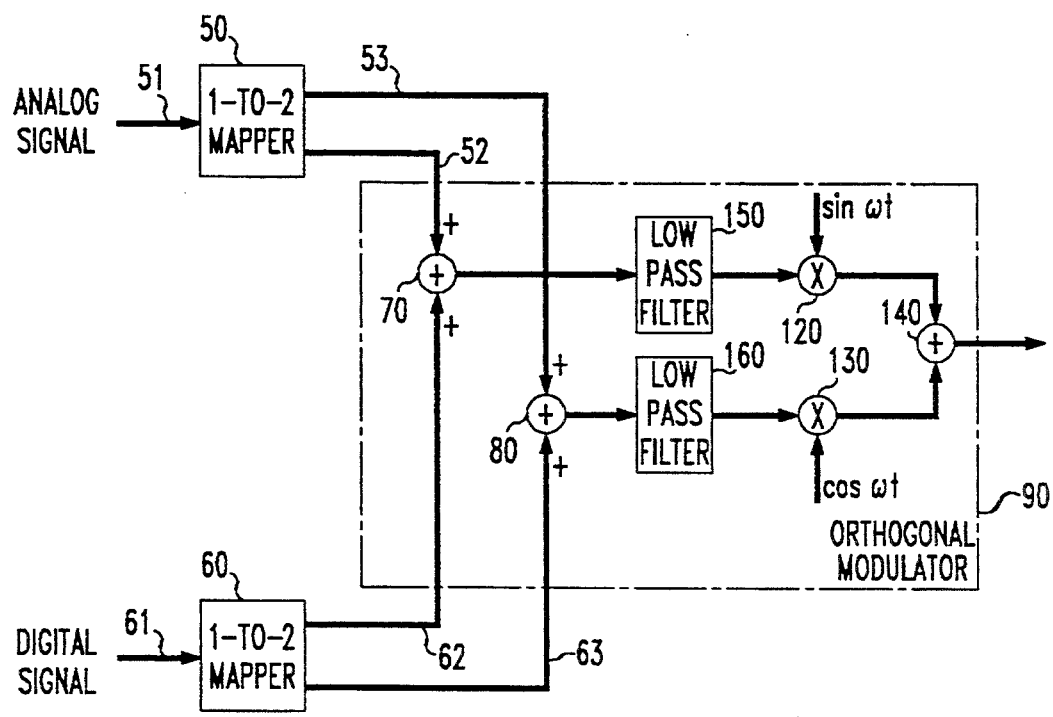
FIG. 6 presents one embodiment of a transmitter section for a combined digital and analog system.

FIG. 6 depicts an arrangement that very basically illustrates the principles of this invention. It includes a 1-to-2 dimensional mapper 60 responsive to digital signals applied on line 61. Mapper 60 develops two output signals on lines 62 and 63, each of which possesses pulses with quantized amplitudes that relate to the digital signals arriving on line 61. FIG. 6 also includes a 1-to-2 mapper 50 that responds to an applied analog signal on line 51, and it develops two output signals on lines 52 and 53, each of which possesses pulses with continuous amplitudes that relate to the analog signal on line 5. Outputs 52 and 62 are combined in adder 70 and outputs 53 and 63 are combined in adder 80. The outputs of adders 70 and 80 form the components of the signals that are represented by the signal space of FIG. 5. As in FIG. 1, the outputs of adders 70 and 80 are applied via low pass filters 150 and 160 to modulators 120 and 130 and summed in adder 140 to form a modulated signal as is typically known in the modem art.

In FIG. 6 element 60 is depicted as a 1-to-2 mapper. However, it should be understood that element 60 can be an M-to-N mapper. That is, element 60 can be responsive to a plurality (M) of digital signals and it can develop a different plurality (N) of output signals. Similarly, element 50 can be a J-to-K mapper that is responsive to a plurality of analog signals. Likewise, the collection of elements that follow elements 50 and 60 (i.e., elements 70, 80, 120, 130, 140, 150 and 160), which form orthogonal modulator 90 can be constructed to be responsive to whatever plurality of outputs of that elements 50 and 60 are designed to produce. More specifically, those elements must account for all of the applied input signals, and that means that they must be able to handle K or N signals, whichever is larger. In such a circumstance, however, the user can assume that the larger of the two (K or N) is the dimensionality of the system, and some of the dimensions have either no digital data, or no analog data, whichever applies. Of course, if there are "dimensions" for which there is no digital or analog dam, other information can be sent over those dimensions, such as equalization "side" information.

Figure 7:
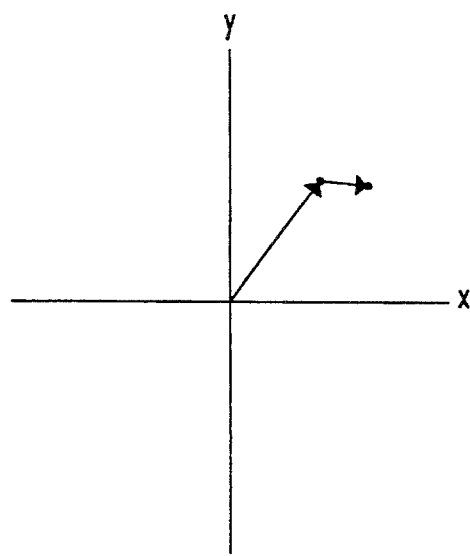
FIG. 7 presents one orthogonal modulation approach.

In the context of a signal space, the N pluralities of output signals of elements 50 and 60 (assuming N is larger than K) correspond to the collection of components of vectors in multi-dimensional space; e.g., N-dimensional space. The coordinates of this multi-dimensional space correspond to the orthogonal modulation signals within orthogonal modulator 90. In FIG. 6, the two orthogonal modulation signals are $\cos\omega t$ and $\sin\omega t$, but other modulation signals are also possible; for example, code division multiplexing (CDMA) templates. For purposes of this invention, orthogonal modulation signals are modulation signals that develop a transmitted signal comprising concurrent element signals and yet allow the receiver to separate the received signal into its constituent element signals, those being the signals developed in response to each of the modulation signals. It may also be observed that, relative to FIG. 5, orthogonal modulator 90 performs vector summation of the symbol vector represented by the components developed by element 60 with the analog information vector represented by the components developed by element 50. This is depicted in FIG. 7.

Figure 8:
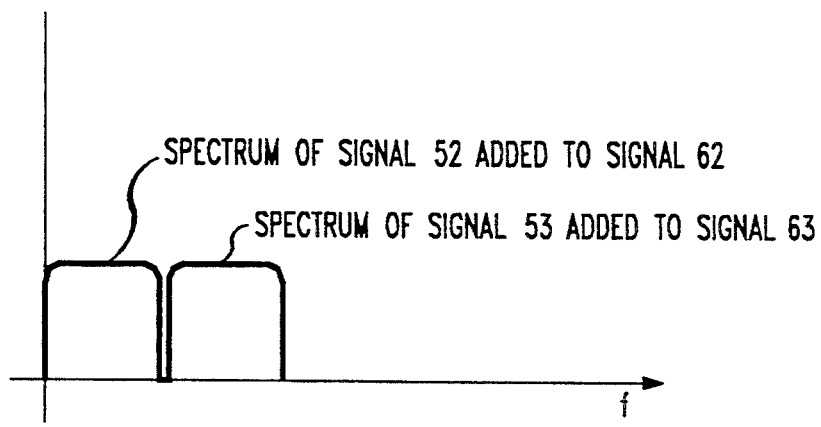
FIG. 8 depicts the vector addition that forms the signal space of FIG. 5.

In connection with FIG. 1, it may be noted in passing that the principles of this invention may be utilized even when the output signals of adders 70 and 80 are communicated (e.g., transmitted) directly, without the benefit of combining them in orthogonal modulator 90. Also, orthogonal modulator 90 can simply be a band-shifting means. To the extent that the output of adder 70 (for example) is bandlimited, the output of adder 80 can be shifted beyond the band-limited output signal of adder 70 and combined with the output signal of adder 70. This is presented in FIG. 8. It may also be appreciated that the principles of this invention may be exercised without the use of element 60 in those situations where no digital streams are presented.

To this point in the instant disclosure the implication has been that the input signal applied to element 50 of FIG. 6 is analog. However, that does not have to be strictly the case. In accordance with conventional techniques, an analog signal that is bandlimited can be sampled (within the proper Nyquist bounds). Hence, it should be understood that the input signal to element 50 can be a sequence of analog samples. Moreover, a sampled analog signal can be quantized and represented in digital form. Indeed, an analog signal that has been sampled and converted to digital form can then be converted to amplitude quantized pulse amplitude-modulated format. All of those representations are representations of an analog signal. For example, the collection of the amplitude-quantized PAM pulses is identical to the original analog signal within the bounds of the quantization errors introduced by the sampling and quantizing (A/D conversion followed by D/A conversion) processes.

The fact that sampling and amplitude quantization of the analog signal at the input of element 50 is permitted offers a number of benefits. For one, it allows the signal to be presented to element 50 in digital format. For another, it permits simple multiplexing of different information sources. Thus, for example, elements 50, 60 and 90 can be implemented in accordance with present day modem realizations; i.e., with one or more microprocessors operating under stored program control.

Figure 9:
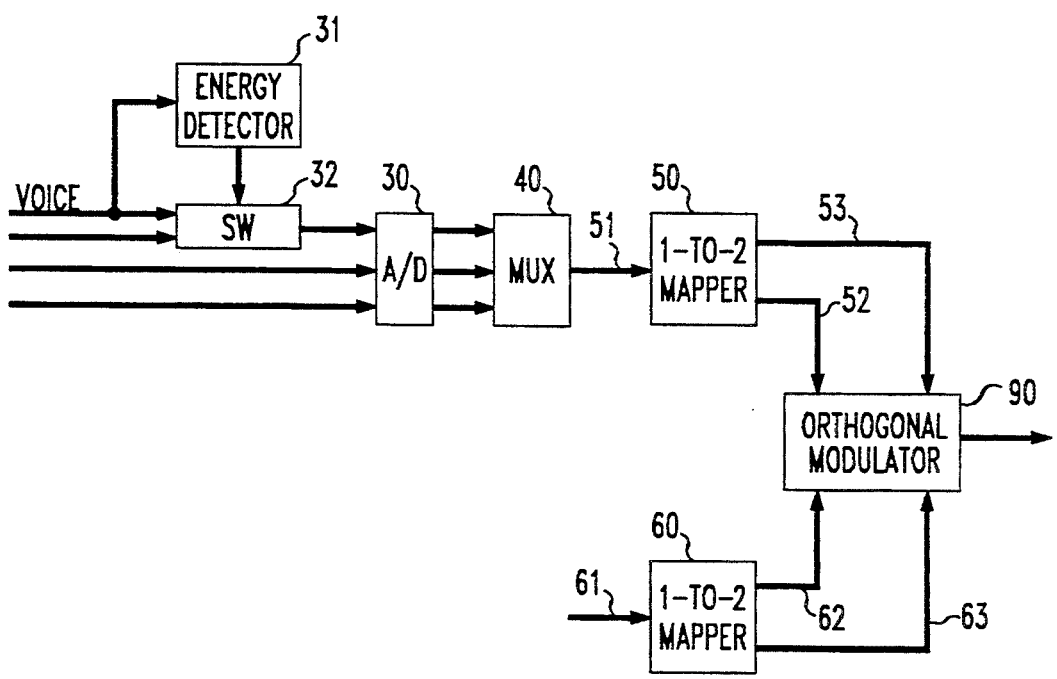
FIG. 9 illustrates the arrangements that permit more than one analog signal source to be transmitted simultaneously.

An example of input signal multiplexing is shown in FIG. 9, which presents an embodiment that includes an A/D converter bank 30 followed by a multiplexer 40. Converter bank 30 converts a plurality of analog signals, such as on lines 33 and 34, to digital format and multiplexer 40 multiplexes its input signals and applies them to element 50. Elements 30 and 40 are conventional A/D and multiplexer elements, respectively.

The combination of elements 30 and 40 allows applying a number of narrowband analog signals to orthogonal modulator 90. The primary limitations are the carder frequency and the allowable transmission bandwidth of the channel. The narrowband signal can, of course, come from any source. For example, a system installed in an ambulance may sacrifice some voice bandwidth in order to allow narrowband telemetry data of blood pressure and heart pulse rate to be communicated concurrently with the voice.

Additionally, a voice signal energy detector may be included, such as disclosed in U.S. Pat. No. 5,081,647, which would detect periods of silence and send less urgent telemetry data during those silence periods. This is illustrated by elements 31 and 32 in FIG. 9.

The fact that the input to element 50 is digital (in a digital implementation of elements 50, 60 and 90) and that the input to element 60 is also digital should not be confused. The digital input to element 60 is a stream of digits that are each equally important. Hence, those digits are converted into symbols and the symbols into constellation points, and the constellation points are within neighborhoods which are identified by a slicer (e.g., slicer 220 in FIG. 1 ) within a modem's receiver section. In contradistinction, the digital signals applied to element 50 correspond to digital words that represent amplitude, and the specific interrelationship between adjacent bits of the digital words is maintained. As indicated above, the signal cloud around a signal point within a constellation does not represent a plurality of signal points that must be distinguished, and that is a fundamental distinction.

Figure 10:
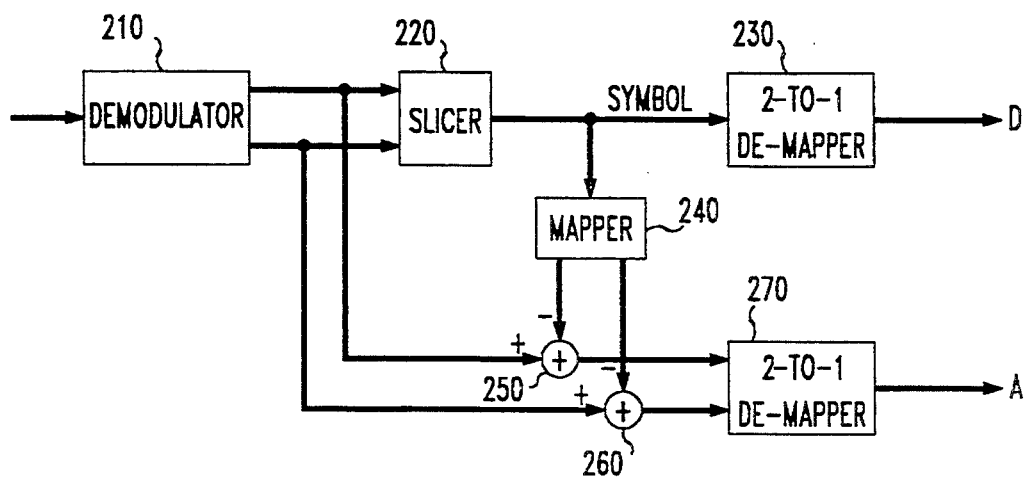
FIG. 10 details the major elements in a receiver in accordance with the principles of this invention.

FIG. 10 presents a basic block diagram of a modem's receiver section in conformance with the principles of this invention. The modulated input signal received from the channel is applied to demodulator 210 which develops the in-phase and quadrature components. Those are applied to slicer 220 which identifies the symbols, and the symbols are applied to de-mapper 230. All this is in accord with conventional modem approaches, as described in connection with FIG. 1. In addition, FIG. 10 includes a mapper 240 that is responsive to the symbols developed by slicer 220. The output of mapper 240 is an accurate estimate of the set of in-phase and quadrature components (that are applied in the FIG. 1 arrangement to elements 150 and 160). The outputs of mapper 240 are subtracted from the outputs of demodulator 210 in subtracters 250 and 260. The outputs of subtracters 250 and 260 are applied to 2-to-1 de-mapper 270 which recombines the analog samples to form an estimate of the original analog signal. De-mapper 270 performs the inverse function of mapper 50.

In may be noted that slicer 220 can be designed to directly provide the output signals that mapper 240 develops; and moreover, de-mapper 230 can be made responsive to such signals. That would alter the FIG. 10 in the sense that slicer 220 and mapper 240 would combine to form a single element and de-mapper 230 as well as adders 250 and 260 would be responsive to that combined element.

In analog realizations of this invention (e.g., FIG. 6), mapper 50 is responsive to analog signals. Various approaches can be taken to develop the plurality of outputs (two outputs, in the case of element 50 shown in the FIGS.). For example, a single bandlimited analog signal can be divided into a plurality of baseband signals by simply filtering and modulating selected sub-bands. Alternatively, element 50 can accept a plurality of bandlimited analog signals and assign each one of the plurality of bandlimited analog signals to different outputs of element 50.

In time sampled realizations of this invention (whether the realization continues with analog circuitry or digital circuitry), element 50 can simply route alternate samples of a single analog signal to different outputs of element 50, or multiplex a plurality of analog signals and distribute the samples of those signals in any convenient manner.

In order to allow for nonlinear techniques that may be employed to enhance the communication qualities of this invention, it is important to effect equalization of the channel in order to minimize intersymbol interference. Conventional modem technology can be brought to bear to this need.

Figure 11:
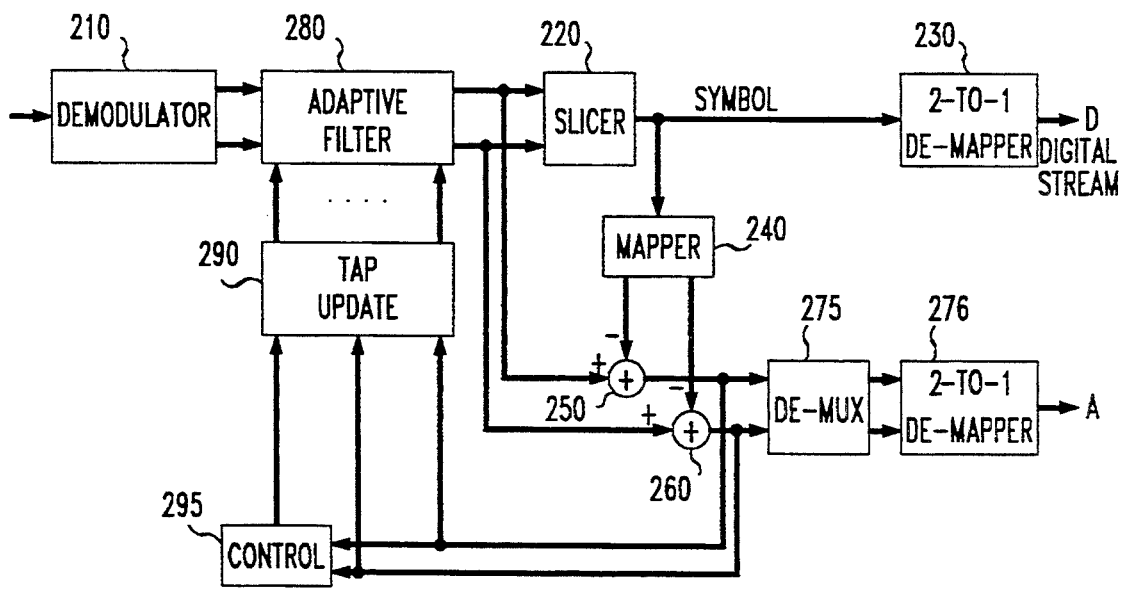
FIG. 11 presents a block diagram of a receiver that includes adaptive equalization.

FIG. 11 presents a block diagram of an arrangement that incorporates equalization. Specifically, FIG. 11 is depicted with a modulator that is followed by equalization hardware (which together can be thought of as a super-demodulator). The equalization hardware comprises an adaptive filter 280 that is interposed between demodulator 210 and slicer 220. The operational characteristics of filter 280 are controlled by filter coefficients that are stored—in modifiable form—within tap update block 290. Tap update block 290 is responsive to the output signals of subtracters 250 and 260. The adaptation of filter 280 is carried out in accordance with conventional modem techniques. The outputs of subtracters 250 and 260 are also applied to demultiplexer 275 and the outputs of demultiplexer 275 are applied to de-mapper 276. De-mapper 276 comprises a bank of de-mappers 270 of FIG. 10. Elements 275 and 276 are included to illustrate a receiver that is adapted for applications where a plurality of analog inputs are multiplexed. Of course, in applications where there is no multiplexing, de-mapper 270 can be substituted.

In accordance with some adaptation approaches, it is easiest to carry out adaptation and the corresponding coefficient updates when the power in the analog signal is small. To limit the process to such intervals, FIG. 11 includes a power detector within control element 295 that is responsive to subtracters 250 and 260. Block 295 is also conventional. It includes a power detection circuit that evaluates the power contained in the signals of subtracters 250 and 260 and delivers a control signal to block 290 to enable (or disable) the coefficient updating process. Of course, block 295 may be more generic, in that the control signal can be derived from other than the analog signal, such as from side information from the transmitter.

FIG. 11 depicts one arrangement for effecting equalization of the transmission channel between a sending modem's transmitter section and a receiving modem's receiver section; to wit, at the receiver's front end, following the demodulator. However, it is well known that equalization can be performed anywhere along the channel, going back even to within a modem's transmitter section.

Figure 12:
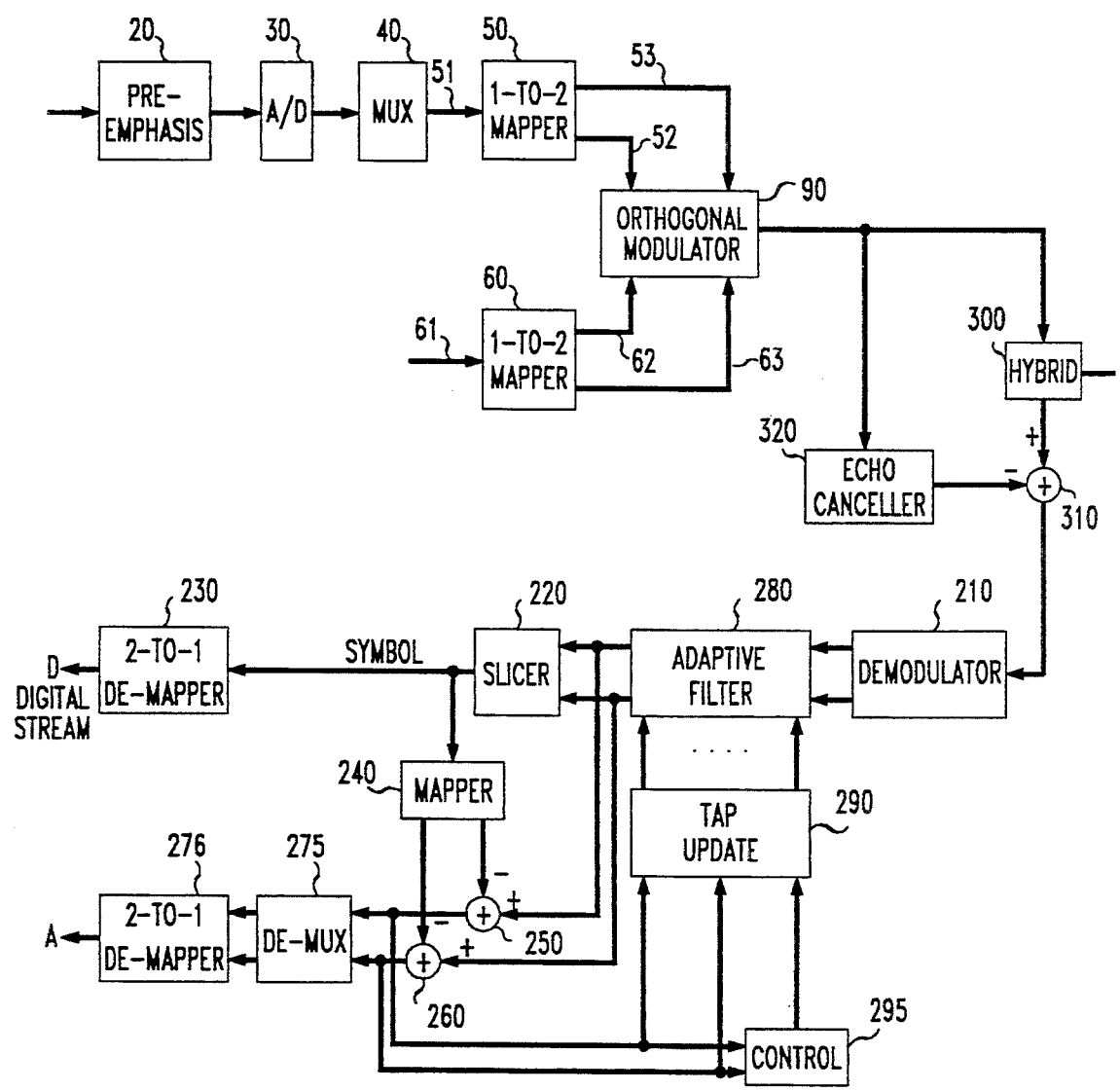
FIG. 12 presents the block diagram of an entire modem.
Figure 13:
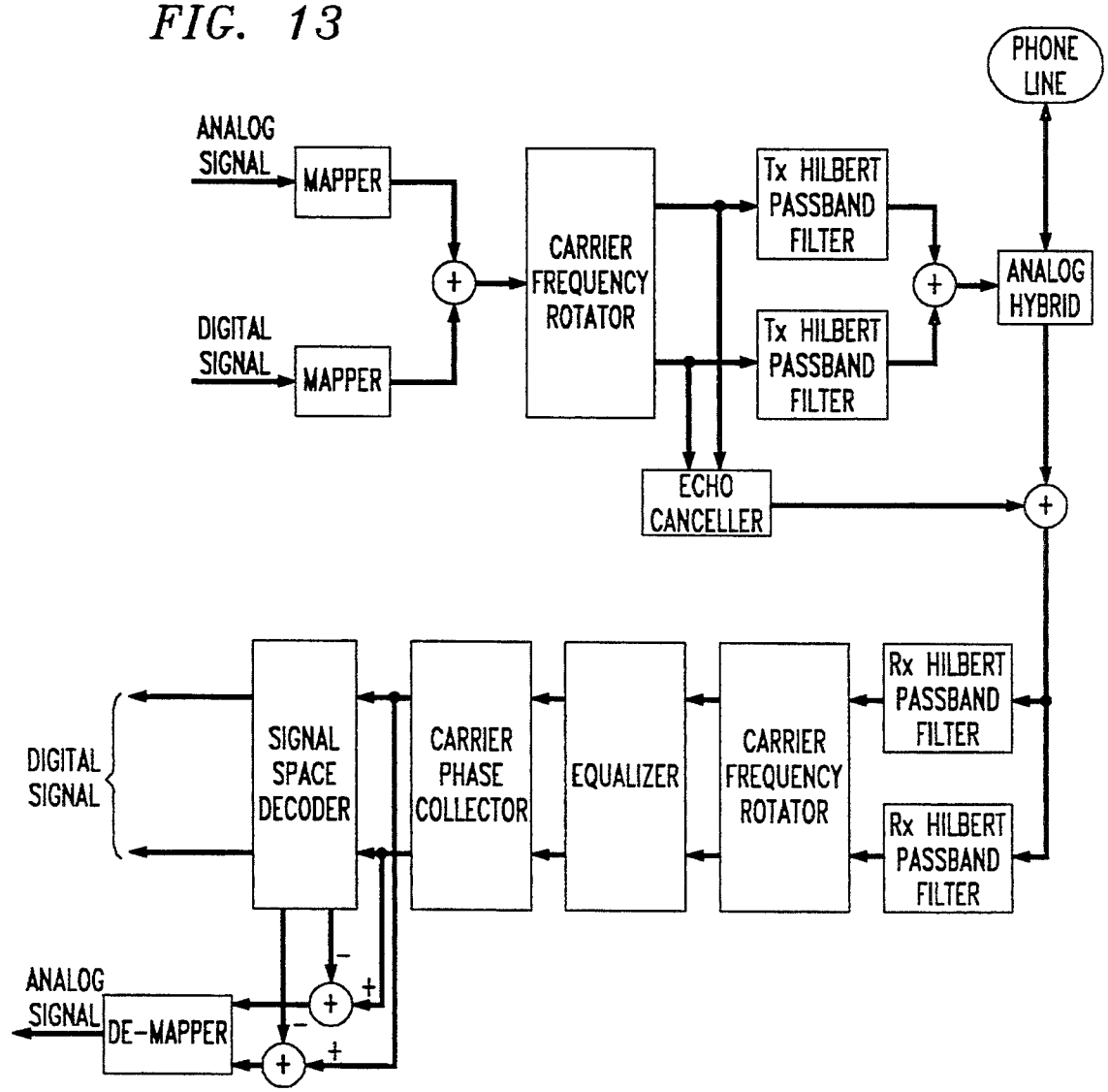
FIG. 13 presents a slightly different embodiment of the FIG. 12 modem.

FIG. 12 depicts the entire, full duplex, modem constructed in accordance with the depictions of FIGS. 9 and 11. More specifically, a transmitter section (FIG. 9) is coupled with a receiver section (FIG. 11 ) through hybrid 300 and subtracter 310. Subtracter 310 cooperates with echo canceller 320 in the conventional way to subtract unwanted signals from the signal applied to demodulator 210. For sake of simplicity, echo canceller 320 is shown to connected to the output of orthogonal modulator 90, and in analog embodiments of element 320 this is perfectly satisfactory. However, in digital embodiments it is well known that efficiencies can be realized by having the echo canceller be responsive to the outputs of mapper 60, where the signal rate is much lower. An improvement which incorporates the principles of this invention is shown in FIG. 13. It may be noted that some of the elements in FIG. 13 are designated by different labels; such as "Hilbert passband filter", which corresponds to a modulator, etc. These are circuits that attain the desired results through somewhat different calculations and are well known to persons skilled in the modem art.

The echo cancelling is performed, as in all modems, during a training period, when the far end signal source is silent and the echo canceller is adapted to minimize the output of subtracter 310.

Figure 14:
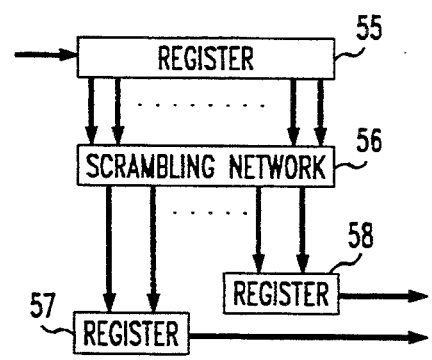
FIG. 14 depicts one structure for scrambling analog samples.

In connection with FIG. 6 it has been disclosed that the input to element 50 can be a sampled analog signal, as well as an unsampled analog signal. It has also been disclosed above that when element 50 is a 1-to-2 mapper (as compared to 1-to-N mapper) and the desired output of element 50 is pairs of a sampled analog signal, the pairs of analog samples can be derived by simply delaying the incoming analog signal by 1/B and sampling both the delayed and the undelayed versions at rate B. This provides sample pairs that correspond to adjacent samples of the original analog signal sampled at rate ½B seconds. Actually, privacy of the communication is enhanced when the samples are not adjacent, and FIG. 14 presents one approach for deriving pairs from non-adjacent samples. It basically includes an input register 55 for storing K analog samples that arrive at rate 2B, a scrambling network 56 that scrambles the outputs of register 55 and develops K outputs, and registers 57 and 58 that are responsive to the outputs of network 56. Registers 57 and 58 store K/2 analog samples every K/2B seconds and output the stored samples at rate ½B seconds. Scrambling network 56 may be simply a cross-connect field.

Other configurations are possible and other elements can be included to enhance operation of the configurations. For example, the "analog" input that enters orthogonal modulator 90 can be filtered to pre-emphasize the high frequencies and, correspondingly, the "analog" output of subtracters 250 and 260 can be filtered to remove the pre-emphasis. The preemphasis can be effected, for example, within the A/D converter 30 or even prior thereto, such as in pre-emphasis filter 20 shown in FIG. 12. The filtering can be done while the "analog" signal is truly analog, or it could be done when the "analog" signal is represented digitally—such as when the transmitter and receiver sections are effected with digital hardware.

Figure 15:
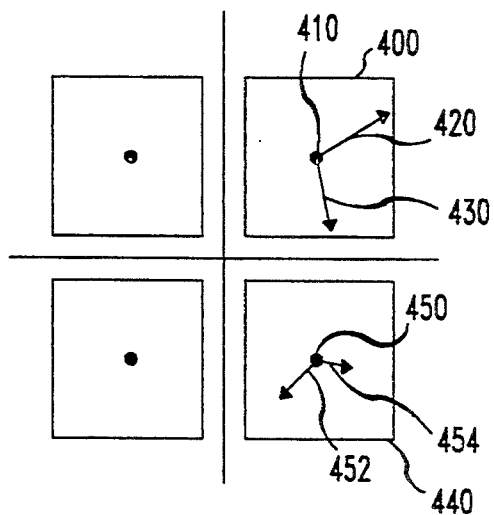
FIG. 15 illustrates a four-symbol or signal point constellation where the regions around each signal point may be occupied by an analog signal.

FIG. 15 illustrates a four-symbol or signal point constellation that is used when a larger amplitude analog signal is added to the data signal that specifies a symbol. Square region 400 surrounding symbol 410 illustrates the amplitude of an analog signal that can be added to data signals specifying symbol 410, without causing a misidentification of the symbol by slicer 220. These regions should be defined so that they do not overlap, and so that the received symbol can be correctly identified by slicer 220. (This is not a strict requirement. See, for example, copending application "Trellis Coding in a Simultaneous Voice and Data System"). Analog signals represented by vectors 420 and 430 illustrate how analog signals with relatively large amplitudes require a low density constellation that provides relatively large regions around the symbols or signal points. Also included in FIG. 15 is region 440 which surrounds symbol 450. In this example, relatively low amplitude analog signals represented by vectors 452 and 454 illustrate that a great deal of space within region 440 is unused by relatively low amplitude analog signals. In an effort to make a more efficient use of the signal space, it is desirable to use a higher density symbol constellation when the analog signals have a low amplitude.

Figure 16:
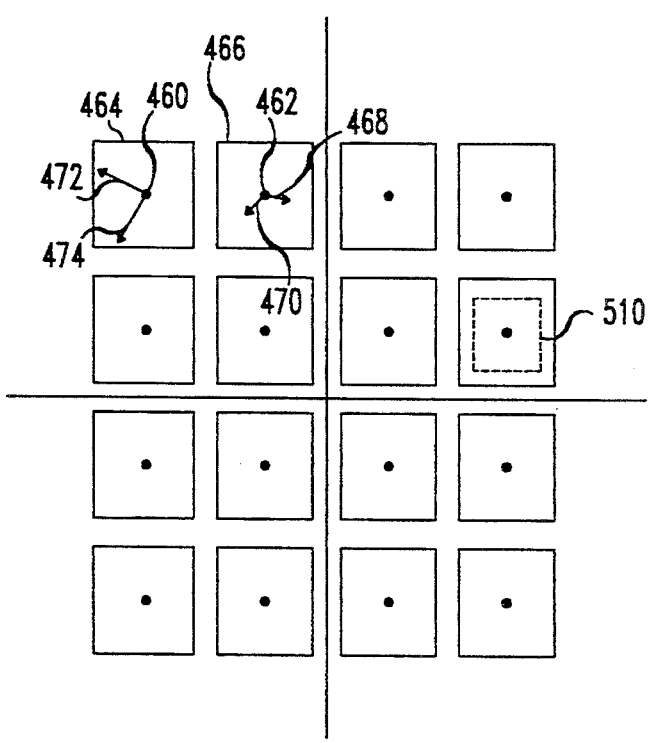
FIG. 16 illustrates a higher density symbol or signal point constellation where the regions around each signal point may be occupied by a lower amplitude analog signal.

FIG. 16 illustrates a higher density symbol or signal point constellation. The constellation of FIG. 16 includes symbols 460 and 462. Each symbol in the constellation has a surrounding region. The square regions illustrate the amplitude of an analog signal that can be added to a data signal, which specifies the symbol within the region, without causing a misidentification of the symbol by slicer 220. In this illustration, symbols 460 and 462 have regions 464 and 466, respectively. With regard to region 466, low amplitude analog signals added to data signals specifying symbol 462 are represented by vectors 468 and 470. As long as the analog signals have an amplitude that is low enough to keep vectors 468 and 470 within region 466, the high density symbol constellation of FIG. 16 can be used. Vectors 472 and 474 within region 464 illustrate larger amplitude analog signals that were added to data signals specifying symbol 460. When vectors 472 or 474 cross the boundary of region 464, a lower density symbol constellation should be used. The lower density constellation has larger regions around its symbols or signal points and will thereby accommodate larger amplitude analog signals. The larger regions permit slicer 220 to correctly identify a symbol specified by a data signal to which a larger amplitude analog signal has been added.

When the amplitude of the analog signal has increased to a point that will cause the analog signal to extend beyond a region surrounding a signal point, the amplitude of the analog signal may be limited until the mapper switches to a less dense symbol constellation.

It is possible to use more than two types of symbol constellations. For example, when the amplitude of the analog signal is very large, a very low density symbol constellation such as a four-symbol constellation may be used. When the analog amplitude is at an intermediate value, medium density symbol constellations such as 16-point constellations may be used. When the amplitude of the analog signal is very low, much higher density constellations may be used such as 32 or 64 point constellations. Any combination of symbol constellations may be used. Constellations that are less dense or more dense than described herein may be used and still come within the scope of this invention.

The amplitude of analog signal is monitored to determine when the symbol constellation should be changed. This monitoring can be carded out in a variety of ways; however, it is preferable to use a simple thresholding technique.

Figure 17:
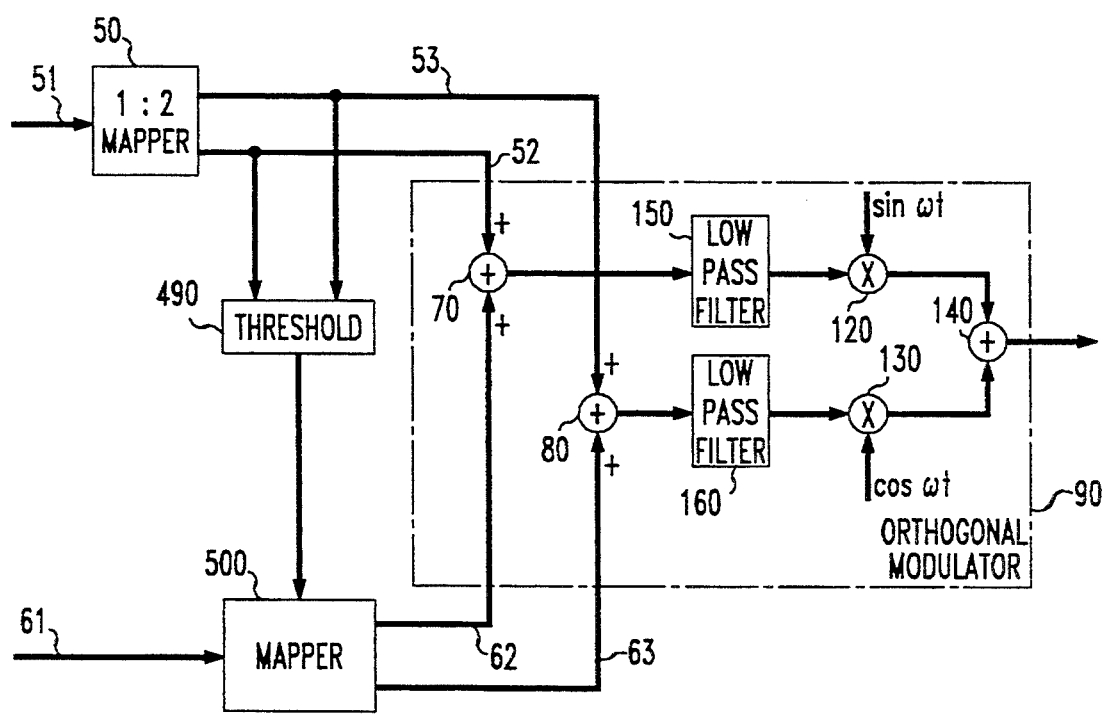
FIG. 17 illustrates a block diagram of a transmitter that embodies the present invention.

FIG. 17 is a block diagram of a transmitter that embodies the present invention. Threshold unit 490 monitors the magnitude of the analog signal produced by encoder or mapper 50. It is also possible to monitor the magnitude of the analog signal at the input to encoder 50. Based on the magnitude of the signal from encoder 50, threshold unit 490 produces an input to mapper 500 that causes the mapper to switch symbol constellations. Threshold unit 490 also supplies a signal that informs the receiver that the symbol constellation will be changed. This information can be passed to the receiver in a variety of ways, for example, threshold unit 490 may inject a digital signal at the input to mapper 500 to indicate an upcoming constellation change. Threshold unit 490 may be fabricated using hardware such as comparators or a software program executed by a microprocessor or microcomputer.

Thresholding can be carded out in a variety of ways. A single threshold may be used to change constellations. For example, when the amplitude of the analog signal falls below a given threshold, a higher density constellation is used, and when the amplitude of the analog signal passes above a threshold, a lower density constellation is used. The threshold should be based on size of the regions surrounding the symbol points of a constellation. For example, the threshold may be set so that it detects an analog signal amplitude that extends beyond a position that is 80% of the distance between a signal point and the boundary of the region surrounding the signal point. In reference to FIG. 16, a threshold of this type is represented by dotted line 510.

It is also possible to use other thresholding techniques. For example, a higher threshold may be used to determine when to switch from a higher density to a lower density constellation, and a lower threshold may be used to determine when to switch from a lower density to a higher density constellation. This type of thresholding technique can be used to add hysteresis to the process. When multiple constellations are used, several thresholds may be used to determine when to move from a less dense to a more dense constellation, or from a more dense constellation to a less dense constellation.

In another embodiment, one or more characteristics of the analog signal are measured or monitored over a defined period of time, and compared to one or more thresholds. The characteristics monitored can be those of the entire analog signal, or those of one or more orthogonal components of the analog signal. Characteristics such as amplitude, peak amplitude, average amplitude and variations in amplitude may be monitored. After comparing the characteristic(s) to one or more thresholds, a constellation change may be executed immediately, or the constellation change may be limited to occurring at predetermined times. The predetermined times may or may not be related to the periods of time over which signal characteristics are monitored. For example, an average of the analog signal's amplitude may be taken over a period P, and if a threshold comparison indicates that a constellation change is necessary, the change may be executed at a predetermined time after the conclusion of time period P. In another example, the peak analog signal amplitude detected during period P is compared to one or more thresholds, and if a constellation change is necessary, the change is not executed until a predetermined time that is not related to period P.

We claim:

1. A communication method comprising the steps of:
   monitoring an energy of a first signal;
   choosing a first signal point constellation from a plurality of signal point constellations based on said energy, wherein said plurality of signal point constellations comprises constellations having different signal point densities;
   adding said first signal to a second signal to produce a combined signal, wherein said second signal is one of a plurality of signal points belonging to said first signal point constellation; and transmitting said combined signal.

2. The communication method of claim 1, wherein said step of monitoring said energy of said first signal comprises monitoring an amplitude of said first signal.

3. The communication method of claim 2, wherein said step of monitoring comprises taking an average of said amplitude over a predefined period of time and comparing said average with a threshold.

4. The communication method of claim 1, wherein said step of monitoring said energy comprises monitoring a peak amplitude of said first signal over a predefined period of time.

5. The communication method of claim 1, wherein said step of monitoring said energy of said first signal comprises comparing an amplitude of said first signal with a threshold.

6. The communication method of claim 1, wherein said step of choosing said first signal point constellation comprises choosing a constellation having a lower density of signal points when an amplitude of said first signal crosses a first threshold and choosing a second constellation having a higher density of signal points when said amplitude crosses a second threshold.

7. The communication method of claim 1, wherein said step of choosing said first signal point constellation from said plurality of signal point constellations comprises choosing from at least three constellations.

8. The communication method of claim 1, wherein said step of monitoring said energy comprises monitoring an orthogonal component of said first signal.

9. The communication method of claim 8, wherein said step of monitoring said energy of said first signal comprises monitoring an amplitude of said first signal.

10. The communication method of claim 9, wherein said step of monitoring comprises taking an average of said amplitude over a predefined period of time and comparing said average with a threshold.

11. The communication method of claim 8, wherein said step of monitoring said energy comprises monitoring a peak amplitude of said first signal over a predefined period of time.

12. The communication method of claim 8, wherein said step of monitoring said energy of said first signal comprises comparing an amplitude of said first signal with a threshold.

13. The communication method of claim 1, further comprising the step limiting an occurrence of a signal point constellation change to predetermined times.

14. The communication method of claim 13, wherein said step of monitoring said energy of said first signal comprises monitoring an amplitude of said first signal.

15. The communication method of claim 14, wherein said step of monitoring comprises taking an average of said amplitude over a predefined period of time and comparing said average with a threshold.

16. The communication method of claim 13, wherein said step of monitoring said energy comprises monitoring a peak amplitude of said first signal over a predefined period of time.

17. The communication method of claim 13, wherein said step of monitoring said energy of said first signal comprises comparing an amplitude of said first signal with a threshold.

18. The communication method of claim 13, wherein said step of monitoring said energy comprises monitoring an orthogonal component of said first signal.

19. The communication method of claim 18, wherein said step of monitoring said energy of said first signal comprises monitoring an amplitude of said orthogonal component.

20. The communication method of claim 19, wherein said step of monitoring comprises taking an average of said amplitude over a predefined period of time and comparing said average with a threshold.

21. The communication method of claim 18, wherein said step of monitoring said energy comprises monitoring a peak amplitude of said orthogonal component over a predefined period of time.

22. The communication method of claim 18, wherein said step of monitoring said energy of said first signal comprises comparing an amplitude of said orthogonal component with a threshold.

* * * * *